June 10, 1969   G. H. STALLARD ET AL   3,448,995
ANTI-ROLL AXLE

Filed Feb. 1, 1967

INVENTORS
GEORGE H. STALLARD
DOREEN E. ALLEN
BY
*Cavanagh & Norman*

United States Patent Office 3,448,995
Patented June 10, 1969

3,448,995
ANTI-ROLL AXLE
George Hugh Stallard, 503 E. 16th St., and Doreen Elizabeth Allen, 75 Carling St., Apt. 208, both of Hamilton, Ontario, Canada
Filed Feb. 1, 1967, Ser. No. 613,248
Int. Cl. B60g *11/20, 19/02*
U.S. Cl. 280—124                        6 Claims

ABSTRACT OF THE DISCLOSURE

This specification discloses mechanism for suspending a pair of wheels from a trailer frame to minimize side sway by transferring loads from one seel to the other with the mechanism including: an axle in the form of a torsion bar pivotally mounted on the frame with the pivots fixed relative to the frame; a pair of trailer arms extending from the torsion bar and rigidly secured thereto; a wheel rotatably mounted at the free end of each torsion bar; a pair of radius rods each having one end driveably secured to the torsion bar; and a shock absorber between the other end of each radius rod and the frame.

---

The invention relates to improvements in small trailer axles for the purpose of reducing roll or sway.

Small light weight trailers are commonly employed for transporting light objects such as for instance small boats, the trailers being usually towed by automobiles. In many instances quite rudimentary suspension systems are employed consisting simply of a two-wheeled axle supported on coiled springs, with or without shock absorbers. Such suspension systems are found to be quite unsatisfactory for use at high speeds and over rough roads, this being a condition to which lightweight trailers, particularly boat trailers, are often subjected to.

It has been found by resort to the present invention that many of the difficulties associated with prior lightweight trailers can be overcome. This is particularly true in the case of reducing sway or roll of the trailer when towed behind a car at high speeds. Wind loads and rough road surfaces combine to produce a cross moment on the trailer and by utilizing the axle arrangement as disclosed in the following, this moment can be largely overcome.

With these conditions in mind an object of the invention is to provide, in a trailer including a frame, an axle in the form of a torsion bar and which axle is pivotally mounted on the frame with the pivot points fixed. A pair of wheels are carried by the torsion bar in offset relation by a pair of trailer arms rigid with the torsion bar. A pair of radius rods are driveably anchored to the torsion bar and each of these rods has a free end adjacent to the frame. A shock absorber is provided between each of these radius rod ends and the frame.

Another object is to provide, in suspension mechanism of the character noted, a damping block which is associated with each of the spring load connections. This rubber block absorbs vibrations in one direction which are generated by the action of the spring loaded connections.

Another object is to provide, in mechanism of the type aforesaid, a snubber block that is associated with the spring loaded connections and damping means. The snubber blocks absorbs vibrations in a direction opposite to that above indicated.

The invention accomplishes these objects and features by the provision of an anti-roll suspension system for use with trailers having a supporting frame for carrying loads thereon, said suspension system comprising a pair of axle suport brackets rigidly secured to the trailer frame; a torsion bar pivotally supported between said axle brackets; a pair of trailing arms rigidly secured to the outer ends of said torsion bar and including at least one wheel on each said trailing arm; a pair of radius rods rigidly secured to and extending from said trailing arms adjacent the position of rigid securement on said torsion bar; a pair of pull rods, one extending in pivotal attachment from the free swinging end of each of said radius rods in a direction opposite to the direction component of the moment of said wheels moving upwardly and to be tangent to about the mid-arc position of said radius rods, at normal loading on the trailer; a pair of frame brackets extending from the trailer frame to terminate at positions intermediate of the ends of said pull rods; a pair of suspension members, normally under resilient compression, each held thus between one said frame brackets and the free end of the respective pull rod; and a pair of snubber blocks one each secured to the respective pull rod intermediate of the respective frame bracket and radius rod; and a pair of damping blocks interposed between the compressible ends of respective suspension members, said suspension members and said damping blocks acting in opposition to the turning moment of said trailing arms through action of said wheels, said snubber blocks resisting opposite moment, said torsion bar transferring moments from one wheel to the other wheel thus to reduce sway.

It is conventional practice to utilize channel bars in the frame construction. It is also desirable to provide, to as great an extent as possible, a protective housing for the spring loaded connections, damping block and snubbing block. This is achieved in the present invention by mounting them on and within the channel bars of the frame.

Other objects and features of the invention will be apparent from the following detailed description and accompanying drawings in which like numerals refer to like parts throughout the various views.

Figure 1:
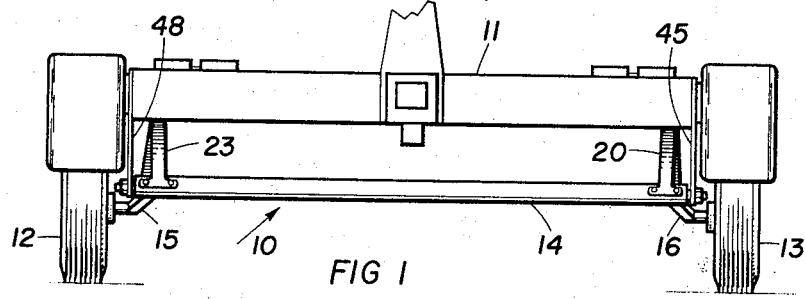
FIGURE 1 is a front elevation view of an anti-roll suspension system mounted below a conventional lightweight trailer.

Referring to FIGURE 1 an anti-roll suspension system 10 is shown mounted onto a conventional trailer 11. The trailer 11 has a frame construction including side channels of U-shaped cross-section. In this preferred embodiment the suspension system 10 is provided with a pair of wheels 12 and 13 supported on a torsion bar 14 which in this system serves as the axle means, the wheels 12 and 13 being secured to the torsion bar 14 by a pair of trailing arms 15 and 16 respectively.

Figure 2:
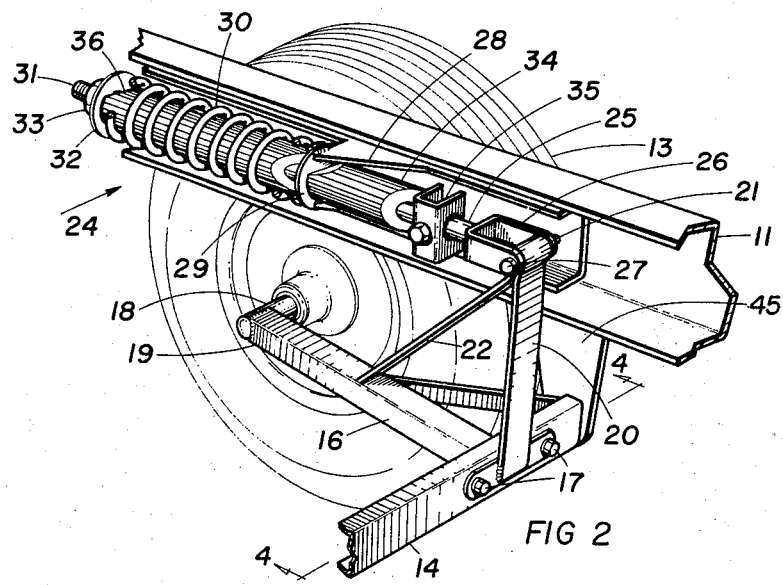
FIGURE 2 is a perspective view of one end of the anti-roll suspension system showing the attachment of the anti-roll axle.

Referring to FIGURE 2 an enlarged perspective view of one side of the anti-roll suspension system is illustrated and it will be understood that the remaining side of the system is identical in construction but of the opposite hand. It will be noted that the trailing arm 16 is rigidly secured to the torsion bar 14 by means of the bolts 17 and the wheel 13 is rotatably supported on the stub axle 18 at the free end 19 of the trailing arm 16.

A radius rod 20 is rigidly secured to the torsion bar 14 and the trailing arm 16 adjacent the point of rigid attachment of the trailing arm 16 to torsion bar 14 and extends upwardly to terminate in a free swinging end 21 and being provided with a stiffening member 22. A similar radius rod 23 is provided on the opposite end of the torsion bar axle 14 as shown in FIGURE 1.

The shock absorbing and damping means for the suspension system is indicated generally at 24 and comprises a pull rod 25 pivotally secured by means of the yoke 26 and the pin 27 to the free swinging end 21 of radius rod 20 and extends in a direction opposite to the direction component of the moment about torsion bar 14 of the wheel 13 moving upwardly and is preferably tangent to about the mid-arc position of the radius rod 20 at normal loading on the trailer 11. In this position the rod 25 extends substantially parallel to the frame 11. A frame bracket 28 is rigidly secured to the frame 11 and extends therefrom to terminate in the plate 29 at a position intermediate of the ends of pull rod 25.

A suspension member which in this preferred embodiment is a coil spring 30 is held in compression between the plate 29 and the end 31 of pull rod 25 by means of the plate 32, adjustment of the compression on spring 30 being accomplished by means of the nut 33 threaded onto the end 31.

A snubber block 34 of resilient material such as for instance, rubber, is mounted on the pull rod 25 between the plate 29 and the pull rod 25 and is adjustably positioned by means of the adjustment clamp 35.

A damping block 36 is mounted on the pull rod 25 between the ends of spring 30 and serves to damp out vibrations of the spring 30. In this case it is also preferable to make the damping block 36 from rubber material.

Figure 3:
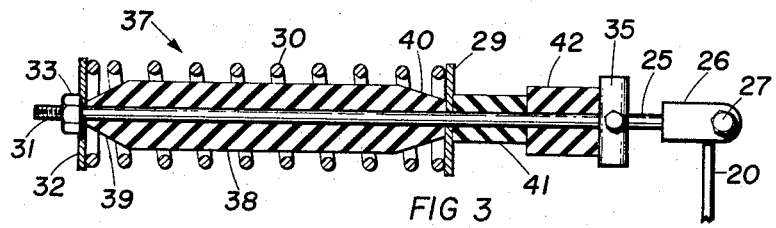
FIGURE 3 is a section through a modified embodiment depicting a damping device utilized with the present invention.

With reference to FIGURE 3 a cross-section through a typical suspension assembly is shown and indicated generally as 37. In this embodiment the pull rod 25 is provided with a damping block 38 having the ends as at 39 and 40 tapered whereby a more gradual damping action is obtained at the ends of the block 38 thereby to absorb the slighter vibrations and oscillations of spring 30, the main body of block 38 serving to dampen out the heavier vibrations.

The assembly 37 is also provided with snubber blocks 41 and 42, the function of the snubber block being to absorb vibrations in the direction opposite to that absorbed by block 38 and to provide a mid-position for the radius rod 20. By utilizing snubber blocks of various diameters the effective range at which the block will absorb vibrations can be varied to suit individual requirements.

Figures 4, 5:
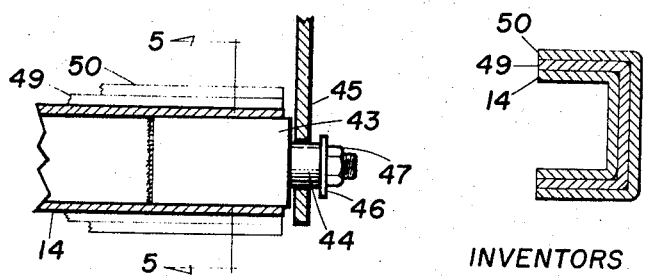
FIGURE 4 is an enlarged section taken on the line 4—4 of FIGURE 2.
FIGURE 5 is a section taken on the line 5—5 of FIGURE 4.

Referring to FIGURE 4 and FIGURE 5, details of the torsion bar 14 are illustrated. The torsion bar 14 is provided with an end block 43 which in this case is welded into the bar 14 and has a projection 44 rotatably mounted in the plate 45. The stub axle or pin 44 is retained within the plate 45 by means of the washer 46 and the threaded nut 47. Referring back to FIGURE 1 a second plate 48 is provided on the opposite side of the trailer 11, both plates 45 and 48 being rigidly secured to the frame 11 by conventional means such as for instance bolting or welding.

In order to increase the strength of the torsion bar 14 without unduly increasing the stiffness thereof secondary torsion bars such as for instance 49 and 50 may be nested about the torsion bar 14 and secured at the ends by means of welding or by means of the bolts 17 as shown in FIGURE 2. It should be understood that any number of nested torsion bars can be utilized to provide the required strength for the anti-roll assembly. It should also be noted that while a channel-shaped cross section is shown in the drawing, other cross sectional shapes may also be resorted to.

In use the anti-roll assembly can be secured to a conventional trailer assembly utilizing the shock absorber assembly 24, one on either side of the trailer, and the desired number of torsion bars can be provided to give the required strength for the intended load on the trailer. Should it subsequently prove necessary to increase the strength of the assembly for carrying heavier loads additional torsion bars may be added to the assembly. Conversely should the assembly prove too stiff or strong for the load carried by the trailer, one or more of the torsion bars can be removed to give a lighter action. It will be seen that while the trailer 11 is being towed over a roadway an upward movement of wheel 12 will cause through the torsion bar 14 similar upward movement in the wheel 13 which tends to stablize the trailer and to reduce the effect of roll due to uneven road surfaces.

It is notable that each assembly of a shock absorber, damping block and snubber block are housed within and partially enclosed by a channel member of the frame 11.

It will be further understood that although specific embodiments of the invention have herein been described and illustrated, the invention also contemplates such variations that may fall within the scope of the appended claims.

What we claim is:

1. An anti-roll suspension system for use with trailers having a supporting frame for carrying loads thereon, said suspension system comprising a pair of axle support brackets rigidly secured to the trailer frame; a torsion bar pivotally supported between said axle brackets; a pair of trailing arms rigidly secured to the outer ends of said torsion bar and including at least one wheel on each said trailing arm; a pair of radius rods rigidly secured to and extending from said trailing arms adjacent the position of rigid securement on said torsion bar; a pair of pull rods, one extending in pivotal attachment from the free swinging end of each of said radius rods in a direction opposite to the direction component of the moment of said wheels moving upwardly and to be tangent to about the mid-arc position of said radius rods, at normal loading on the trailer; a pair of frame brackets extending from the trailer frame to terminate at positions intermediate of the ends of said pull rods; a pair of suspension members, normally under resilient compression, each held thus between one of said frame brackets and the free end of the respective pull rod; a pair of snubber blocks one each secured to the respective pull rod intermediate of the respective frame bracket and radius rod; and a pair of damping blocks interposed between the compressible ends of respective suspension members, said suspension members and said damping blocks acting in opposition to the turning moment of said trailing arms through action of said wheels, said snubber blocks resisting opposite moment, said torsion bar transferring moments from one wheel to the other wheel thus to reduce sway.

2. A suspension system as claimed in claim 1 wherein said damping blocks and said snubber blocks are formed from a length of resilient tubular material having the ends thereof cut at an angle to the central axis to provide less resilient resistance at said ends.

3. A suspension system as claimed in claim 1 wherein said damping block is provided with tapered ends of reduced thickness relative to the main body portion of the damping block.

4. A suspension system as claimed in claim 1 including adjustable stop means interposed between said snubber block and the pivoted end of said pull rod to adjustably pre-compress said snubber block between said clamping means and said frame bracket.

5. A suspension system as claimed in claim 1 including a second snubber block of reduced diameter relative to the first said snubber block.

6. A suspension system as claimed in claim 1 including a second damping block of reduced diameter relative to the first said damping block.

References Cited

UNITED STATES PATENTS 1,058,588  4/1913  Hubbard _____ 280—106.5

3,071,366  1/1963  Loehr _____ 267—57

FOREIGN PATENTS 192,774  11/1957  Austria.

PHILIP GOODMAN, Primary Examiner.

U.S. Cl. X.R.

267—57; 280—106.5